3,528,913
REMOVING NITRIC ACID FROM AQUEOUS SOLUTIONS
Walter Appelt, Ludwigshafen, Hans-Martin Weitz, Frankenthal, and Leopold Golser, Ludwigshafen, Germany, assignors to Badische Anilin- & Soda-Fabrik Aktiengesellschaft, Ludwigshafen (Rhine), Germany
No Drawing. Filed Oct. 22, 1968, Ser. No. 769,743
Claims priority, application Germany, Oct. 24, 1967, 1,667,397
Int. Cl. C02c 5/02
U.S. Cl. 210—59                    5 Claims

ABSTRACT OF THE DISCLOSURE

To remove nitric acid from aqueous solutions the latter are treated with carbon monoxide at elevated temperature and superatomspheric pressure.

---

It is known that aqueous nitric acid is often used as an oxidising agent. Thus for example elementary bromine may be recovered from dilute aqueous solutions containing sodium bromide and/or hydrogen bromide (such as are obtained by the process according to U.S. patent application Ser. No. 551,145 filed May 18, 1966, by Hans-Martin Weitz et al.) by the action of nitric acid of medium concentration at superatmospheric pressure and at elevated temperature. Moreover propylene can be converted by means of nitric acid into lactic acid. Since nitric acid is used as a rule in excess of the amount stoichiometrically required, the reaction solution contains an amount of nitric acid which depends on the excess of nitric acid used. In many cases it is necessary to remove nitric acid from these solutions, for example when the reaction solution is to be returned to the process or is to be worked up by a method with which the residual nitric acid would interfere. No satisfactory methods of removing nitric acid have been known hitherto.

We have now found that surprisingly nitric acid can be removed from aqueous solutions without difficulty by reaction with carbon monoxide at elevated temperatures when the reaction is carried out at superatmospheric pressure.

Surprisingly it is possible by means of the process according to this invention to decrease the nitric acid content of an aqueous solution to such an extent that the acid practically cannot be detected analytically, although from the literature (cf. Gmelins Handbuch der Anorganischen Chemie, 8th edition, Nitrogen, system No. 4, page 1006) it is known that an aqueous solution of nitric acid cannot be reduced with carbon monoxide either in the cold or at the boiling point at atmospheric pressure.

In order to achieve an adequate reaction rate it is advantageous to carry out the reaction at temperatures above 100° C., particularly above 150° C. It is not advisable to raise the temperature substantially above 300° C. because although maintaining still higher temperatures is not detrimental to the reaction they are not accompanied by any appreciable advantages as regards increase in the reaction rate. It is therefore advantageous to use a temperature range of for example 150° to 250° C.

The pressure to be maintained during the reaction is advantageously more than 50 atmospheres and it is preferred to use a range up to about 200 atmospheres. In principle higher pressures may be used but in this case, too, the reaction rate is not appreciably increased by higher pressures. Pressure and temperature are interdependent in such a way that with increasing temperature a decrease of pressure can be carreid out without the residual nitric acid content being altered. Pressures of from 50 to 120 atmospheres are advantageously chosen when temperatures of 200° to 250° C. are maintained, especially in continous operation and with short residence times. It is generally necessary to maintain a residence time of at least about five minutes to achieve an adequate reaction.

In addition to carbon dioxide it is mainly nitrogen monoxide and small amounts of nitrogen and nitrous oxide which are formed in the reaction, and these can easily be expelled from the solution. It is an essential advantage of the process according to this invention that the nitric oxide may be reconverted to nitric acid, i.e. the nitrogen can be recovered. The nitric acid thus obtained may be used again for example for the oxidation reaction which precedes the process according to this invention.

In general a stoichiometric excess of carbon monoxide with respect to the amount of nitric acid present is used. This excess may be for example ten to fifty times the amount stoichiometrically required. It is not essential for pure carbon monoxide to be used for the reaction. Mixtures of this gas with other gases may be used provided they are inert to the other components of the solution. Thus it is often possible to use mixtures of carbon monoxide and hydrogen such as are available in industry in large amounts. When using such mixtures it is advantageous to increase the reaction pressure according to the dilution of the carbon monoxide.

In principle aqueous solutions of nitric acid of any concentration can be reduced by means of the process according to this invention, and it should be emphasized that even dilute solutions having a content of less than 10% of $HNO_3$ can be reduced. The advantage of the process according to this invention resides not only in the use of inexpensive reducing agents which are easily accessible industrially but also in the fact that the solutions treated are not contaminated with other troublesome reducing substances, as is the case for example in the reduction of nitric acid with sulfur dioxide.

The process may be carried out batchwise or continuously. Continuous operation may be carried out in any apparatus by means of which gaseous and liquid substances can be brought into contact with one another.

The invention is illustrated by the following examples. The parts specified in the examples are parts by weight.

EXAMPLE 1

Carbon monoxide is forced at room temperature and under 200 atmospheres pressure into a 1000-ml. autoclave containing 100 ml. of a solution consisting of 93.6 parts of water and 6.4 parts of nitric acid. The autoclave is heated rapidly to 200° C. and left at this temperature for thirty minutes, a rise in pressure to 60 atmospheres being observed. After the end of the experiment, nitric acid can no longer be detected analytically in the aqueous solution. Besides carbon monoxide and carbon dioxide, mainly nitrogen monoxide and small amounts of nitrous oxide and nitrogen are found in the gas phase.

EXAMPLE 2

Carbon monoxide is forced at room temperature and under 20 atmospheres pressure into a 2000-ml. autoclave containing 200 ml. of a solution consisting of 300 parts of primary sodium phosphate, 194 parts of hydrogen bromide, 2 parts of copper (II) bromide, 806 parts of water and 64 parts of nitric acid. The autoclave is then heated rapidly to 160° C. and kept at this temperature for thirty minutes, the pressure thus rising to 46 atmospheres. After the experiment is over, nitric acid can no longer be detected analytically in the solution. The bromide content of the solutions has not changed.

EXAMPLE 3

Carbon monoxide is forced at room temperature and under 40 atmospheres pressure into an autoclave (volume 500 ml.) containing 50 ml. of a solution which consists of 93 parts of water, 5 parts of lactic acid and 2 parts of nitric acid. The autoclave is heated rapidly to 150° C. and kept at this temperature for thirty minutes, the pressure thus rising to 70 atmospheres. After the whole has been cooled, nitric acid can no longer be detected analytically in the solution.

EXAMPLE 4

A high-pressure reactor having a total volume of 28 liters is almost completely filled with balls of ceramic material having a diameter of 6 to 20 mm. so that the free volume is about 13.5 liters. 40.5 liters per hour of a solution having the following composition:

| | Parts |
|---|---|
| Hydrogen bromide | 126.5 |
| Primary sodium phosphate | 407 |
| Copper (II) bromide | 2 |
| Water | 780 |
| Nitric acid (100%) | 28 | is passed through this reactor. This throughput is equivalent to a residence time of twenty minutes. At the same time 15 cubic meters (STP) of carbon monoxide is passed per hour into the reactor. The temperature is 230° C. and the pressure is 120 atmospheres.

The solution leaving the reactor has the following composition:

| | Parts |
|---|---|
| Hydrogen bromide | 126.5 |
| Primary sodium phosphate | 407 |
| Copper (II) bromide | 2 |
| Water | 796 |
| Nitric acid | [1]<0.13 |

[1] Equivalent to less than 0.5% of the amount of nitric acid originally contained in the solutions.

We claim:
1. A process for removing nitric acid from an aqueous solution thereof which comprises reacting said nitric acid with carbon monoxide at an elevated temperature and at superatmospheric pressure.
2. A process as claimed in claim 1 carried out at a temperature of more than 150° C.
3. A process as claimed in claim 1 or 2 carried out at a pressure of more than 50 atmospheres.
4. A process as claimed in any of claims 1 to 3 carried out within a temperature range of from 150° to 250° C.
5. A process as claimed in any of claims 1 to 4 carried out at a pressure not exceeding about 200 atmospheres.

References Cited

Mellor, J. W.: A Comprehensive Treatise on Inorganic and Theoretical Chemistry, Longmans, Green & Co., 1924, vol. 5, pp. 940 and 948.

MICHAEL E. ROGERS, Primary Examiner

U.S. Cl. X.R.

23—157, 216